Patented Dec. 3, 1929

1,737,953

UNITED STATES PATENT OFFICE

CHARLES URFER, OF GENEVA, SWITZERLAND, ASSIGNOR TO SOCIÉTÉ D'ETUDES MINIÈRES & INDUSTRIELLES, OF PARIS, FRANCE, A CORPORATION OF FRANCE

MANUFACTURE OF AMMONIA

No Drawing. Application filed January 25, 1927, Serial No. 163,552, and in France July 6, 1926.

The present application is in part a continuation of and in part an improvement upon the subject-matter of, my previous application for Letters-Patent, Serial No. 79 039, filed January 2, 1926.

In said prior application I have described a process for the production of metallic nitrides, and for the production of ammonia, which process consists essentially in causing a mixture of heated nitrogen and hydrogen to pass over a metal of the iron group (or a mixture of metals of that group) commingled with a compound or compounds of lithium, such for example as lithium nitride or amide, in the presence of an oxide of one of the aluminum family.

Said process was based upon the discovery that metals of the iron group (iron, nickel, cobalt, etc.) form nitrides at relatively low pressures (approximating atmospheric pressures) when heated in the presence of nitrogen, in contact with a nitrogen compound of lithium, as above described. Whereas theretofore, in the direct nitridation of iron by heating in an atmosphere of nitrogen, the reaction does not proceed, even at an excessively high temperature (e. g. 1400° C.) except under a relatively high pressure. Therefore, the direct nitridation of iron, and the direct synthesis of ammonia in presence of a metal of the iron group, has been supposed theretofore to be attainable only at a high pressure.

I have discovered that by still using lithium nitride or amide (such as amides according to the formula $Li_3AzH_2$ or amides according to the formula $Li_2AzH$, sometimes called imides) or any other convenient nitride, I may substitute for the oxides of the bodies of the aluminium family either an halogenide such as a chloride, or a bromide, or an iodide, or a fluoride, of the alkaline or earth alkaline metals (sodium, potassium, lithium, strontium, calcium, barium) or a mixture of these compounds; or an alkaline or earth-alkaline oxide or a mixture of these oxides or a ferrocyanide or a ferricyanide of such metals or a mixture of these compounds; or again a mixture of several of the compounds above referred to.

Owing to this substitution the temperature at which ammonia is produced is much lower than in my previous process; instead of being formed at a temperature of about 500° C. and upwards, the production of ammonia takes place at a temperature as low as 250° C. when using my new process according to the present invention, and the reaction has proved to be a very good one between 350° and 450° C.

I do not claim herein specifically the oxyhalides, the alkali-forming metal oxides, or the ferro and ferricyanides, herein referred to as capable of being used to replace the oxide of the aluminum family of my previous application; but I reserve the right to claim the same specifically in a division, or in several divisions of the present application. I do, however, regard the said alternative as being analogous to the above specified halides, having found them to be the equivalents thereof for the purposes of the present invention; and I regard them as being therefore embraced generically within the scope of the following claims.

What I claim is:

1. A process for the manufacture of ammonia, which consists in causing a heated mixture of nitrogen and hydrogen to react with at least one metal of the iron group, at least one compound of lithium containing nitrogen, and an alkali-forming halide.

2. A process for the manufacture of ammonia, which consists in causing a mixture of heated nitrogen and hydrogen to react with at least one metal of the iron group in presence of a compound of lithium containing nitrogen, and in presence of an alkali-forming metal halide.

In testimony whereof I have affixed my signature.

CHARLES URFER.